United States Patent [19]

Pike et al.

[11] Patent Number: 4,809,210

[45] Date of Patent: Feb. 28, 1989

[54] MULTICHANNEL DIGITAL SIGNAL CORRELATOR OR STRUCTURATOR

[75] Inventors: Edward R. Pike; Peter N. Pusey, both of Malvern, England

[73] Assignee: Secretary of State for Defence in Her Britannic Majesty's Government of the United Kingdom of Great Britain and Northern Ireland, London, England

[21] Appl. No.: 809,782

[22] Filed: Dec. 17, 1985

[30] Foreign Application Priority Data

Dec. 17, 1984 [GB] United Kingdom ............... 8431837

[51] Int. Cl.$^4$ ............................................. G06F 15/31
[52] U.S. Cl. ............................................. 364/728.03
[58] Field of Search ............... 364/728, 819, 824, 841, 364/845

[56] References Cited

U.S. PATENT DOCUMENTS

3,842,252 10/1974 Jakeman et al. ............... 364/713
4,071,903 1/1978 Head et al. ..................... 364/728
4,593,378 6/1986 McWhirter et al. ........... 364/900

FOREIGN PATENT DOCUMENTS

2115192 9/1983 United Kingdom.

OTHER PUBLICATIONS

Computer Design, "Multichannel High Speed Correlator", vol. 16, No. 2, Feb. 1977, pp. 118.
O'Driscoll et al., "A Digital Correlator With Blinker Facility", J. Physics E: Sci. Instrum., vol. 13, 1980, pp. 192-199.

"Photon Correlation and Light Beating Spectroscopy", Eds. Cummins et al., Plenum Press, New York, 1974.
"Photon Statistics and Photon-Correlation Spectroscopy", Pike et al., *Advances in Quantum Electronics*, vol. 2, 1, 1974, Academic Press.
"Statistical Accuracy in the Photon Counting Structure Function of Fluctuating Light Fields", Oliver et al., *Optical Acta*, 1981, vol. 28, No. 10, pp. 1345-1358.

*Primary Examiner*—Gary V. Harkcom
*Assistant Examiner*—Tan V. Mai
*Attorney, Agent, or Firm*—Cushman, Darby & Cushman

[57] ABSTRACT

A multichannel digital signal correlator or structurator receives pulses e.g. from a photo multiplier (1) and passes them through a standardizer into channels 1 to M. Each channel has a counter ($5_m$, m=1 to M) and shift register ($6_m$) together with a multiplier ($7_m$) and accumulator ($8_m$). Clock pulses are applied to each counter (9) and shift register ($6_m$) from a clock (4) through frequency dividers ($9_m$) each set to different values giving increasing sample times ($T_s$) in successive channels. Each multiplier ($7_m$) has one input to the first stage of its associated shift register ($6_m$) and another input connected to the fourth stage of the shift register ($6_m$). Thus the multipliers receive two inputs one delayed (by $\tau$) with respect to the other input. Accumulators (10, 11) count the number of photomultiplier pulses and clock pulses respectively during an experimental run. The correlator thus correlates two signals with increasing sample times ($T_s$) and increasing delays ($\tau$) in successive channels. A correlation function is obtained from the collective contents of all accumulators ($8_m$, 10, 11). The multipliers ($7_m$) may be replaced by difference squarer circuits to form a structurator.

9 Claims, 2 Drawing Sheets

MULTICHANNEL DIGITAL SIGNAL CORRELATOR OR STRUCTURATOR

BACKGROUND AND SUMMARY OF THE INVENTION

This invention concerns a digital signal processor in which a mathematical operation is carried out between non-delayed and delayed data.

Such a processor may perform an auto or cross correlation function, or a structure function calculation.

In a typical digital correlator an input signal is divided into successive sample intervals. Digital numbers representative of the signal during each sample interval are clocked serially through the correlator for correlation. A series of digital numbers is clocked along an M-stage shift register to form a delayed signal. A non-delayed series of digital numbers is applied to one input of M different multipliers. The other input of these multipliers is taken from successive stages of the shift register. Each multiplier thus operates on a different delay. The output of each multiplier is accumulated in one of M different counters providing M different channels. At the end of an experimental run the collective content of the counters represents the correlation function of the input signal or signals. This correlator may be termed a linear correlator because the delay between successive channels increases linearly.

An alternative type of digital signal processor measures the "structure function" of the input signal which for long experiments has an equivalent form to the correlation function. To measure this alternative function a "structurator" is required which operates exactly as a correlator described above except that the multiply circuits are replaced by circuits which subtract their two inputs and then square the results.

The correlator may perform an auto correlation or a cross correlation on data. For an auto correlation the input signal is replicated into two identical signals; one signal is delayed and multiplied by the other non-delayed signal. For a cross correlator a first signal is delayed and multiplied with a second, but non delayed, signal.

Digital signal processing enables highly accurate mathematical operations to be carried out on signals. Due to recent advances in logic speed complicated processing can be carried out in real time. Also advances in the statistical theories of some events have simplified the processing of some functions. One example of this is in laser light scattering experiments, particularly in weak scattering events.

Detailed investigation into the properties of light scattering led to the development of a single clipped digital correlator described in U.K. Patent Specification No. 1,290,336. This correlator allowed the processing of signals representing the arrival of single photons on a sensitive detector. From this a whole range of work has been made possible, for example, laser light scattering where the light scattered by a suspension of particles in a liquid can be processed to give particle diffusion coefficients.

In the above linear digital correlator a correlation function is accumulated from information obtained in successive sample interval channels. Increasing the number of sample channels allows further information to be obtained but results in increased equipment costs.

One solution to the problem of collecting information from many sample intervals is described in G.B. No. 2,115,192 A and its U.S. equivalent U.S. Pat. No. 4,593,378. In this specification the time delay between each channel is geometrically increased. Thus for example using 26 channels with a $\sqrt{2}$ progression between channels information can be obtained from the equivalent of a delay interval of 8192 in a linear correlator e.g. G.B. No. 1,290,336 and its U.S. equivalent U.S. Pat. No. 3,842,252. The correlator of G.B. No. 2,115,192 A relies on correlating a signal, at geometrically increasing delays, to obtain the maximum information for a given number of channels. However information is still available from the non-correlated delays. Such uncollected information becomes more important at low counting rates. G.B. No. 2,115,192 A also applies to the principle of increasing delays to a measurement of the structure function.

The present invention extends the data collected from a correlator or structurator such as taught by G.B. No. 2,115,192 A, without the huge increases in equipment channels that would be involved if the linear correlator of G.B. No. 1,290,336 were merely extended.

According to this invention in a multi-channel correlator or structurator both the time delay between channels and sampling times in successive channels are progressively increased.

According to this invention a multi-channel digital signal processor has:
  a device for receiving series of digital numbers in successive sample time intervals (T);
  an accumulator for counting the total number of digital signals received;
  a plurality of channels each having
    a series of delays along which a series of digital numbers is transferred to provide a delayed signal,
    an arithmetic section for receiving at one input a digital signal and at another input the delayed signal, and
    an accumulator for receiving the output of the arithmetic section;
  a device for progressively increasing the sample time interval ($T_s$) in successive channels; and
  a device for increasing the delay ($\tau$) in successive channels.

The arithmetic section may be a multiplier, in which case the processor is a correlator. Alternatively the arithmetic section may be a difference squarer circuit, in which case the processor is a structurator.

The delayed signal in each channel may be obtained by clocking a digital signal along a multistage multibit shift register.

The means for progressively increasing the channel sample time ($T_s$) may be frequency dividers set to divide the sample time T by set amounts to clock the delayed signal. These frequency dividers may have fixed values or be changeable to suit differing experiments.

The increase in $T_s$ between channels m and m−1 may be a constant multiplicative factor, i.e.

$$T_s^{(m)} = \alpha T_s^{(m-1)} \tag{1}$$

so that $$T_s^{(m)} = \alpha^{M-1} T_s^{(1)} \tag{2}$$

$\alpha$ may be an integer or may take a non-integral value with $\alpha^{m-1}$ rounded to the nearest integer. The delay time $\tau$ may be a fixed or variable multiple of $T_s$ e.g.

$$\tau^{(m)} = \beta T_s^{(m)} \quad (3)$$

where $\beta$ is an integer.

BRIEF DESCRIPTION OF THE DRAWINGS

The invention will now be described by way of example only with reference to the accompanying drawings of which.

DESCRIPTION OF THE PREFERRED EMBODIMENT

Figure 1:
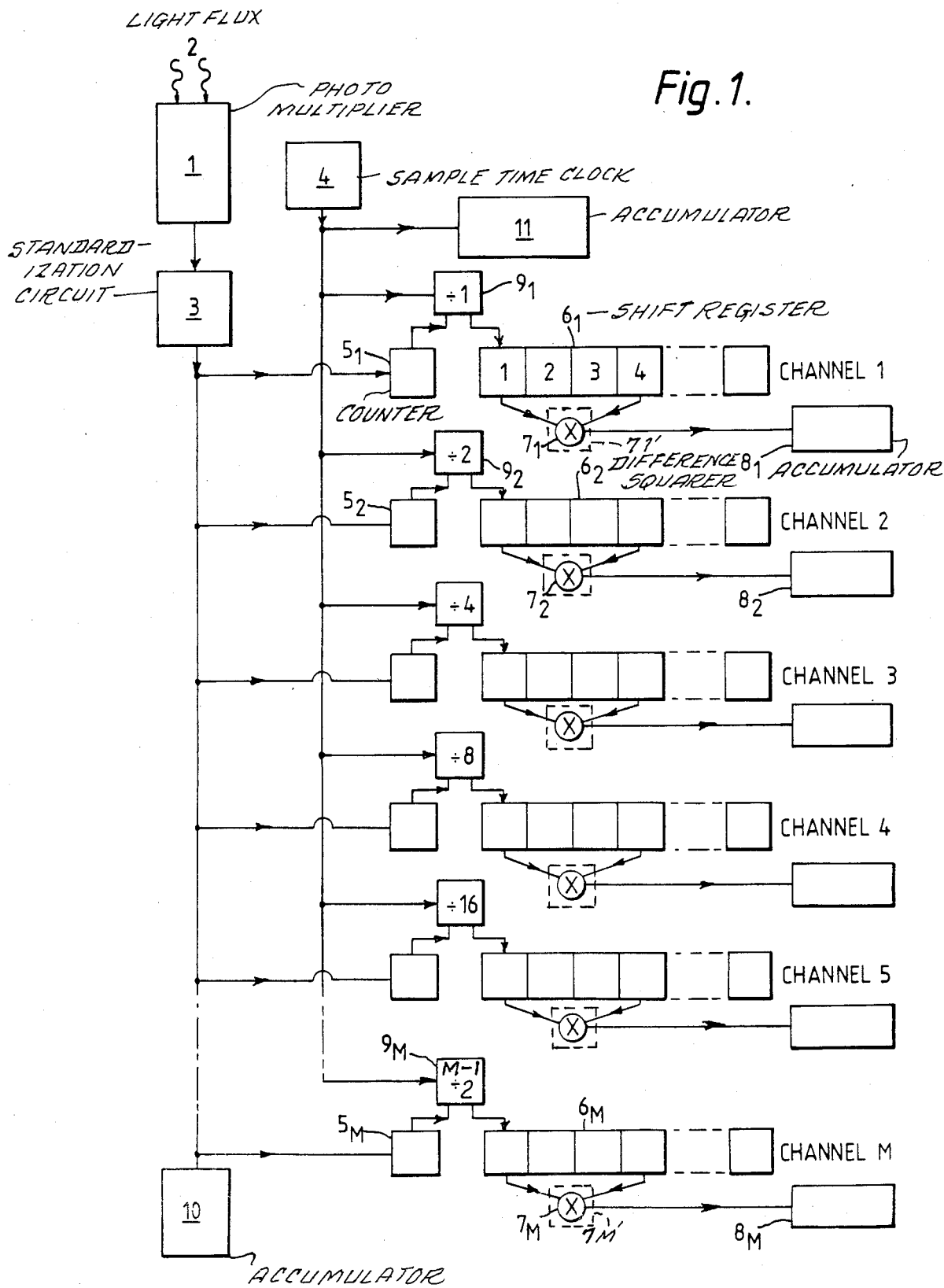
FIG. 1 is a schematic view of the correlator.
Figure 2:
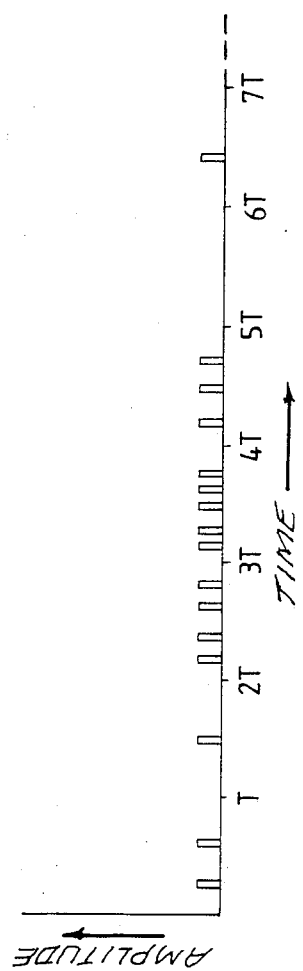
FIG. 2 is a graph showing the signal to be correlated.

In the realisation shown in FIG. 1, the dilation factor $\alpha$ (equation 1) is 2 and the delay factor $\beta$ is 3.

The correlation circuitry of FIG. 1 receives a signal from a photomultiplier, indicated by numeral 1. The photo-multiplier output is a stream of pulses each representing receipt of a photon in a light flux 2. These pulses have a random distribution of amplitude and charge. They are converted to pulses of equal amplitude and duration by the standardisation circuitry 3.

A sample time clock 4 of basic period t can be programmed to provide sample intervals T=ut where u is an integer varied to suit experimental use. This allows the correlator to sample the standardised data on differing time intervals, changing the effective span and range of the correlator in delay time space.

The correlator has M channels, typical M is 24. The number used depends on the nature of the experiment being investigated, frequently only the first 10 or so channels will be needed.

Each channel comprises a counter 5, a shift register 6, a multi-bit multiplier 7, and an accumulator 8. The shift registers $6_{1-M}$ are multibit and of any desired number of stages.

In the example shown the multipliers $7_{1-M}$ connect to stages 1 and 4 of the register $6_{1-M}$ and feed into the accumulators $8_{1-M}$ to form a (stationary) time average $<n_{T_s}(o)\ n_{T_s}(\tau)>$ as explained later. Here $n_{T_s}(t)$ is the number of pulses received in a sample interval of duration $T_s$ centred at time $t_d$ and the angle brackets denote the average. In other examples of processor (not shown) the multipliers ($7_m$) are connected to stage 1 and n (n>3) of the register to suit experimental conditions.

The counters $5_{1-M}$ receive pulses from the standardiser 3. Sample time clock pulses of duration T are sent to each shift register via frequency dividers 9 set for this example, as listed in Table 1.

| Channel number m | Frequency Division $f^{(m)}$ | Channel Sample times $T_s^{(m)}$ | Channel delay interval $\tau^{(m)}$ |
|---|---|---|---|
| 1 | 1 | T | 3T |
| 2 | 2 | 2T | 6T |
| 3 | 4 | 4T | 12T |
| 4 | 8 | 8T | 24T |
| 5 | 16 | 16T | 48T |
| 6 | 32 | 32T | 96T |
| 7 | 64 | 64T | 192T |
| 8 | 128 | 128T | 384T |
| 9 | 256 | 256T | 768T |
| 10 | 512 | 512T | 1536T |
| M | $2^{M-1}$ | $2^{M-1}$T | $3 \times 2^{M-1}$T |
| (In general m | $\alpha^{m-1}$ | $\alpha^{m-1}$T | $\beta \times \alpha^{m-1}$T) |

$T_s^{(m)}$ is the sample time used in channel m. It is the fundamental clock sample time T multiplied by the number set by the divider circuit $9_m$.

The delay time $\tau^{(m)}$ is the delay in time between the non-delayed and delayed inputs to the multiplier $7_m$.

Accumulator 10 accumulates standardised pulses for the duration of an experiment to form $<n_{T_s}>$ as explained later. Accumulator 11 collects clock pulses of duration T over an experiment to provide N, the total number of clock pulses.

To conduct an experiment the value of u and hence T, (T=ut), is set in accordance with expected results e.g. previous experiments. Typically the value of n can be set between 1 and 3200 and t can be one microsec. Thus T, in this example can be varied between 1 microsec and 32 millisec. The contents of all the correlator stores, counters 5, accumulators 8, 10, and 11 and registers 6, are set to zero. Light from an experiment, e.g. scattered by a particle suspension, is received by the photomultiplier 1 whose output is fed to the standardiser 3. Pulses from the standardiser 3 enter the counters 5 and are clocked at the appropriate channel sample times. At the end of the sample time $T_s^{(m)}$ appropriate to channel m in the contents of counter $5_m$ are clocked into the first stage of the shift register $6_m$ the previous contents of the first stage are shifted to the second stage and so on. Also the contents of stages 1 and 4 are multiplied in the multiplier $7_m$ whose output is accumulated in the accumulators $8_m$.

An experimental run will typically last many sample times $T_s^{(m)}$. At the end of the experiment channel accumulator $8_m$ contains the value $$N^{(m)} <n_{T_s}(m)(O)n_{T_s}(m)(\tau_m)>$$

Here $N^{(m)}$ is the total number of sample times appropriate to channel m which have occurred in the duration of the experiment. It is related to the total number N of sample times T, obtained from accumulator 11, through the relation $$N^{(m)} = N/f^{(m)} \quad (4)$$

where $f^{(m)}$ is the divide frequency set in divider $9_m$. Also at the end of the experiment, accumulator 10 contains the value corresponding to the total number of pulses $n_p$ accumulated during the experiment. The average number of pulses obtained in one sample time $T_s^{(m)}$, appropriate to channel m, is thus $$n_{T_s}(m) = \frac{n_p}{N^{(m)}} = \frac{n_p f^{(m)}}{N} \quad (5)$$

The theory of digital correlation is known for example from "Photon Correlation and Light Beating Spectroscopy" Eds. H. F. Cummins and E. R. Pike, Plenum, New York, 1974, and the theory of the digital structure function is known for example from C. J. Oliver and E. R. Pike, Optical Acta 281, 345-58, 1981.

For most digital correlation experiments it is necessary to obtain the correlation function $g^{(2)}[\tau^{(m)}]$ of the input signals defined by $$g^{(2)}[\tau^{(m)}] = \frac{<n_{T_s}(m)[O]n_{T_s}(m)[\tau^{(m)}]>}{n_{T_s}(m)^2}$$

where $n_{T_s^{(m)}}[t_d]$ is the number of pulses counted in sample time $T_s^{(m)}$ centred at time $t_d$ and the $\langle \ldots \rangle$ represent a long-time average. As an example, in laser light scattering by a suspension of particles, $$g^{(2)}[\tau^{(m)}] = 1 + \{g^{(1)}[\tau^{(m)}]\}^2 \quad (7)$$

where $$g^{(1)}[\tau^{(m)}] = \exp[-\Gamma\tau^{(m)}] \quad (8)$$

$$\Gamma = D_T \left(\frac{4\pi}{\lambda} \sin\frac{\theta}{2}\right)^2,$$

$\Gamma$ is the decay rate of the correlation function
$D_T$ is the translational diffusion co-efficient of the particles
$\mu$, the light wavelength,
$\theta$, the scattering angle.

The quantity $g^{(2)}[\tau^{(m)}]$ is obtained from the accumulator outputs from the following calculation:

$$g^{(2)}[\tau^{(m)}] = \frac{(\text{Contents of } 8_m) \times (\text{Contents of } 11)}{(\text{Contents of } 10)^2 \times (f^{(m)})^2} \quad (9)$$

The structurator gives an estimate of the same function by the relation $$g^{(2)}[\tau^{(m)}] = 1 - \frac{(\text{Contents of } 8_m) \times (\text{Contents of } 11)}{2 \times (\text{Contents of } 10)^2 \times (f^{(m)})^2}$$

The correlator described above could be adapted in several ways:

The divide frequencies set in dividers 9 and the shift register stages connected by multipliers 7 could be programmed to any values to suit experimental needs.

The correlator may be adapted via switches (not shown) to connect as a linear correlator on all channels. This could incorporate extending the shift register in the first channel to have the same number of stages as the number of channels. The multipliers $7_{1 \text{ to } M}$ would then connect via the switches to the first stage and to successive stages of this extended shift register $8_1$.

In later channels where the sample time $T_s^{(m)}$ becomes large, say greater than one millisec, but depending on the processor used, the correlator operations described above could be performed in software by a suitably interfaced computer (rather than using the hardware described above).

To perform cross correlation of two different signals, the input of multipliers 7 connected to stage 1 of the shift register 6 in FIG. 1 could instead be fed by additional counters, similar to 5, fed in turn by a standardiser, similar to 3, operating on the second signal.

The growing correlation function could be displayed on an oscilloscope after each sample interval $T_s^{(m)}$ in the unnormalised form $$\frac{\text{Contents of } 8_m}{f^{(m)}}$$

A restriction on the above correlator arises from so-called temporal integration. For a correlation function of the form of equation 8 the measured correlation function $g_m^{(1)}(\tau)$, obtained using sample time $T_s$, is related to the ideal function $\exp(-\Gamma\tau)$ by $$g_M^{(1)}(\tau) = \exp(-\Gamma\tau)\frac{\sinh\Gamma T_s}{\Gamma T_s} \quad (10)$$

(see e.g. Cummins and Pike, references above).

If $T_s$ is the same for all $\tau$ (as in a linear correlator) the last factor $(\sin h\Gamma T_s)/\Gamma T_s$ is independent of $\tau$ and therefore constitutes an unimportant multiplicative factor. However when $T_s$ is a function of $\tau$, as in equation 3, the situation is more complicated. Substitution of (3) in (10) followed by expansion of the second factor in (10) gives $$g_M^{(1)}(\tau) = \quad (11)$$

$$\exp(-\Gamma\tau)\left[1 + \frac{1}{6}\beta^{-2}(\Gamma\tau)^2 + \frac{1}{120}\beta^{-4}(\Gamma\tau)^4 + \ldots\right]$$

For $\beta \gg 1$ the "correction terms" in the square brackets are relatively unimportant. For example when $\Gamma\tau = 1$ and $\beta = 3$, $$\frac{1}{6}\beta^{-2}(\Gamma\tau)^{-2} \approx 0.02.$$

Thus $g_M^{(1)}(\tau) \approx \exp(-\Gamma\tau)$ for $\beta \geq 3$ and temporal integration effects can be neglected. The same result holds for the structure function.

We claim:

1. A digital signal processor comprising:
   means for receiving a digital signal, which is formed of a series of digital numbers, in successive sample time intervals (T);
   an accumulator, connected to said receiving means, for counting the total number of said digital signals received;
   a plurality of channels each having means connected to said receiving means, for processing said digital signals;
   a series of delay circuits, connected to said processing means, for receiving said series of said processed signals as a data input to provide a delayed signal;
   an arithmetic, circuit, connected to said delay circuit, for receiving at a first input said processed signals and at a second input the delayed signals;
   an accumulator, connected to said arithmetic circuit, for receiving the output of the arithmetic circuit;
   means, connected to said means for processing said digital signals, for progressively increasing a channel sample time interval ($T_s$) in successive ones of said channels; and
   means, connected to said delay circuits, for increasing a delay time ($\tau$) in successive ones of said channels.

2. The processor of claim 1 wherein the means for progressively increasing the channel sample time ($T_s$) are frequency dividers arranged to divide the sample time (T) by amounts determined and set before an experiment run.

3. The processor of claim 2 wherein the frequency dividers can be adjusted to change some channel sample times ($T_s$).

4. The processor of claim 1 wherein the delay time in all channels has a fixed relationship to the channel sample time.

5. The processor of claim 4 wherein the increase ($\alpha$) in sample time ($T_s$) between adjacent channels is equal to two whilst the delay time ($\tau^{(m)}$) in each channel is equal to three ($\beta=3$) multiplied by the associated channel sample time ($T_s^{(m)}$), where m is an integer equal to a channel number.

6. The processor of claim 1 wherein the delay time in each channel can be varied.

7. The processor of claim 1 wherein the arithmetic circuit is a multiplier.

8. The processor of claim 1 wherein the arithmetic circuit is a difference squarer.

9. The processor of claim 1 and further comprising switches for switching the inputs to the arithmetic sections whereby the processor is constructed as a linear processor.

* * * * *